Jan. 21, 1941.    J. A. POPP    2,229,590
SAUSAGE MACHINE
Filed April 23, 1938    8 Sheets-Sheet 1

Jan. 21, 1941.  J. A. POPP  2,229,590
SAUSAGE MACHINE
Filed April 23, 1938  8 Sheets-Sheet 2

INVENTOR.
Joseph A. Popp
BY
F.D. Hicks
ATTORNEY.

Jan. 21, 1941.  J. A. POPP  2,229,590
SAUSAGE MACHINE
Filed April 23, 1938   8 Sheets-Sheet 3
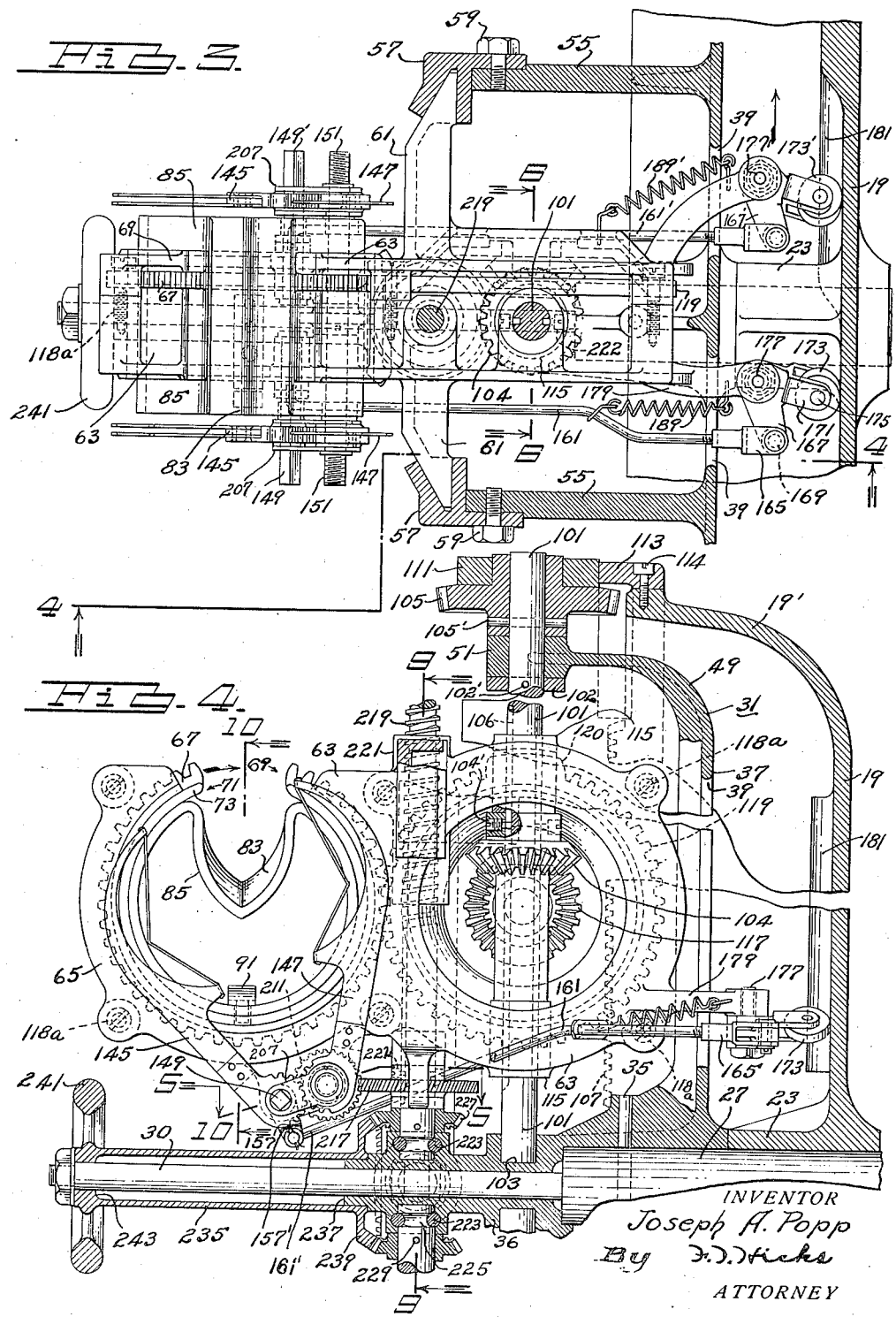

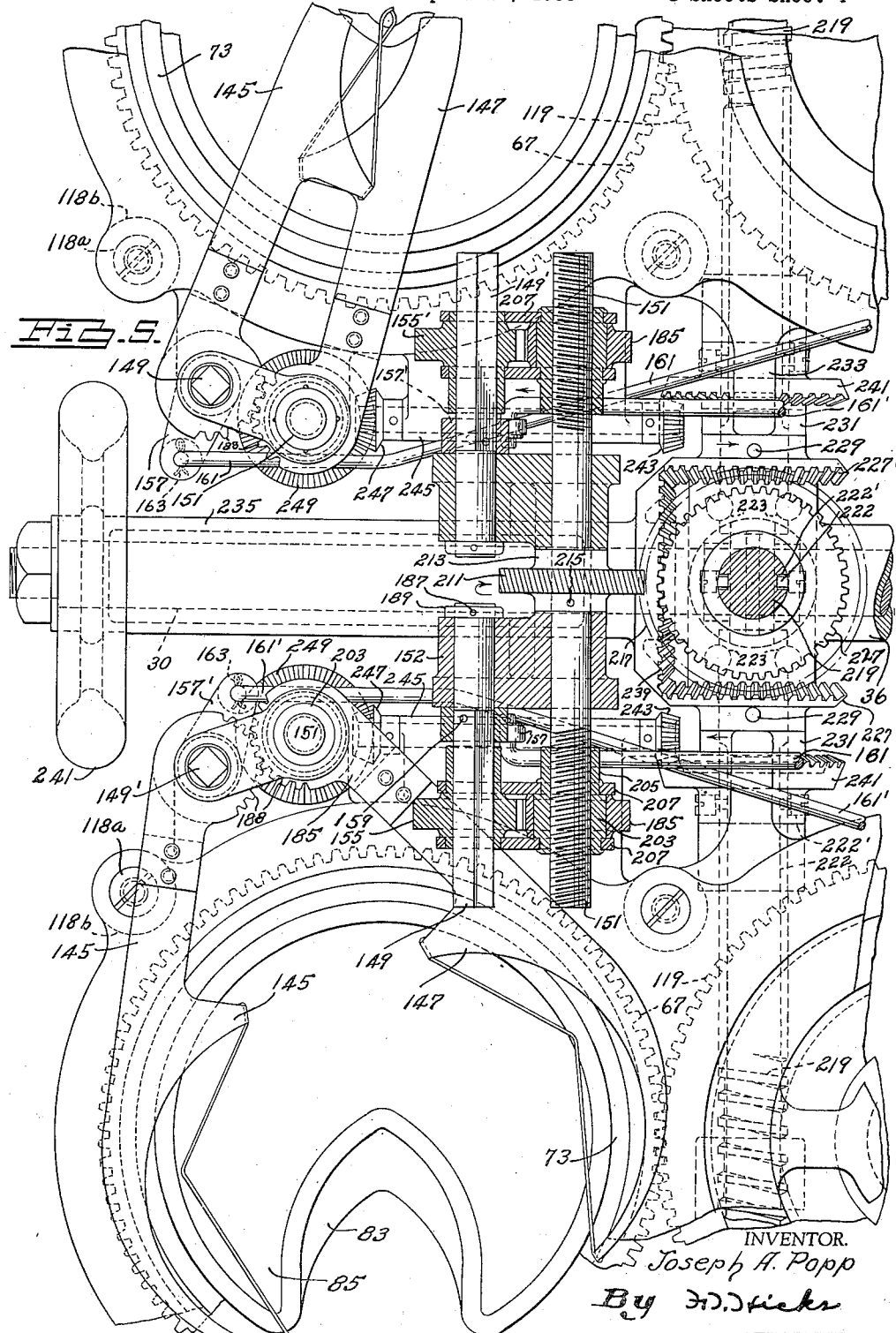

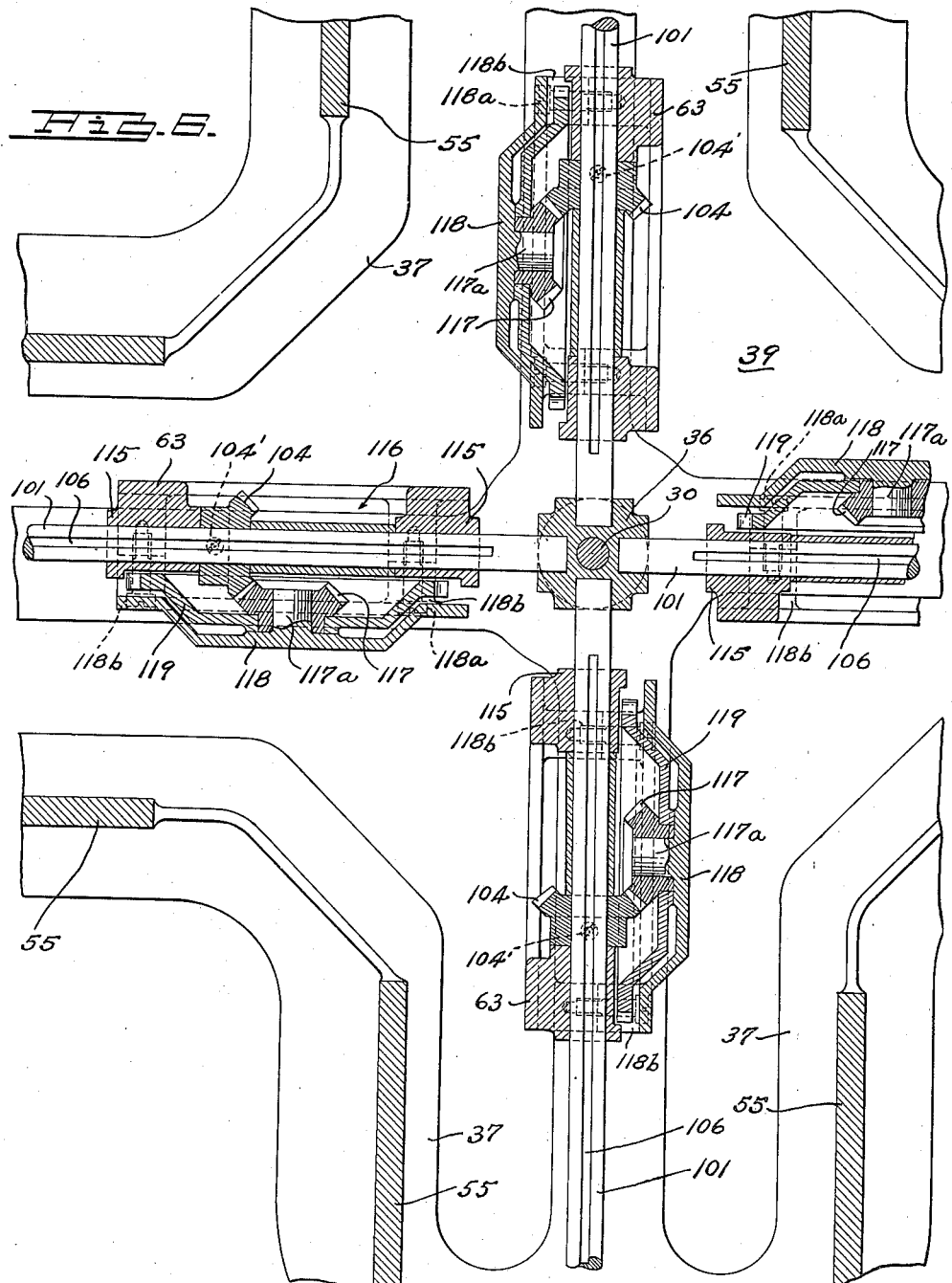

Jan. 21, 1941.   J. A. POPP   2,229,590
SAUSAGE MACHINE
Filed April 23, 1938   8 Sheets-Sheet 6
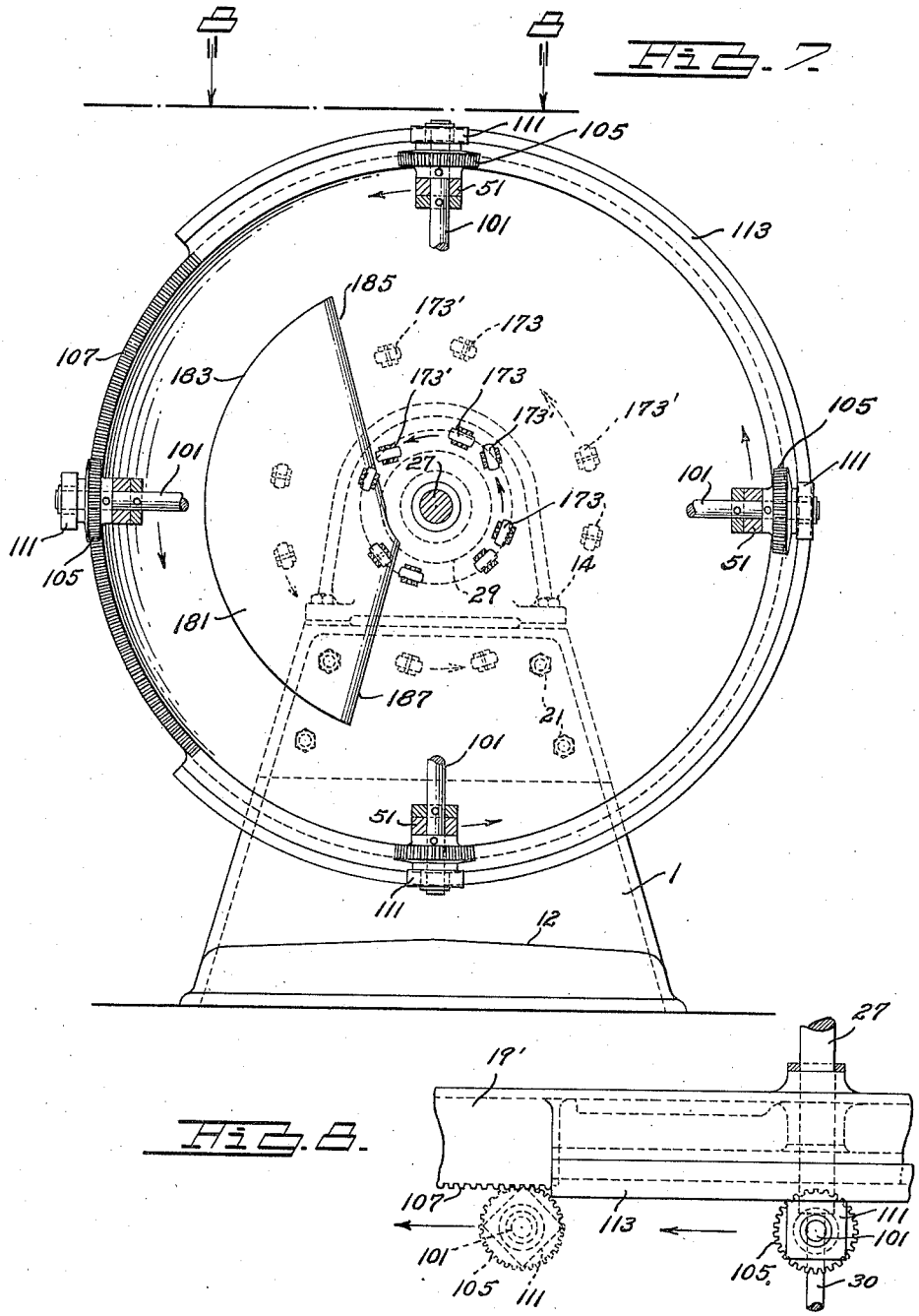
INVENTOR.
Joseph A. Popp
BY   F. D. Hicks
ATTORNEY.

Jan. 21, 1941.  J. A. POPP  2,229,590
SAUSAGE MACHINE
Filed April 23, 1938  8 Sheets-Sheet 7
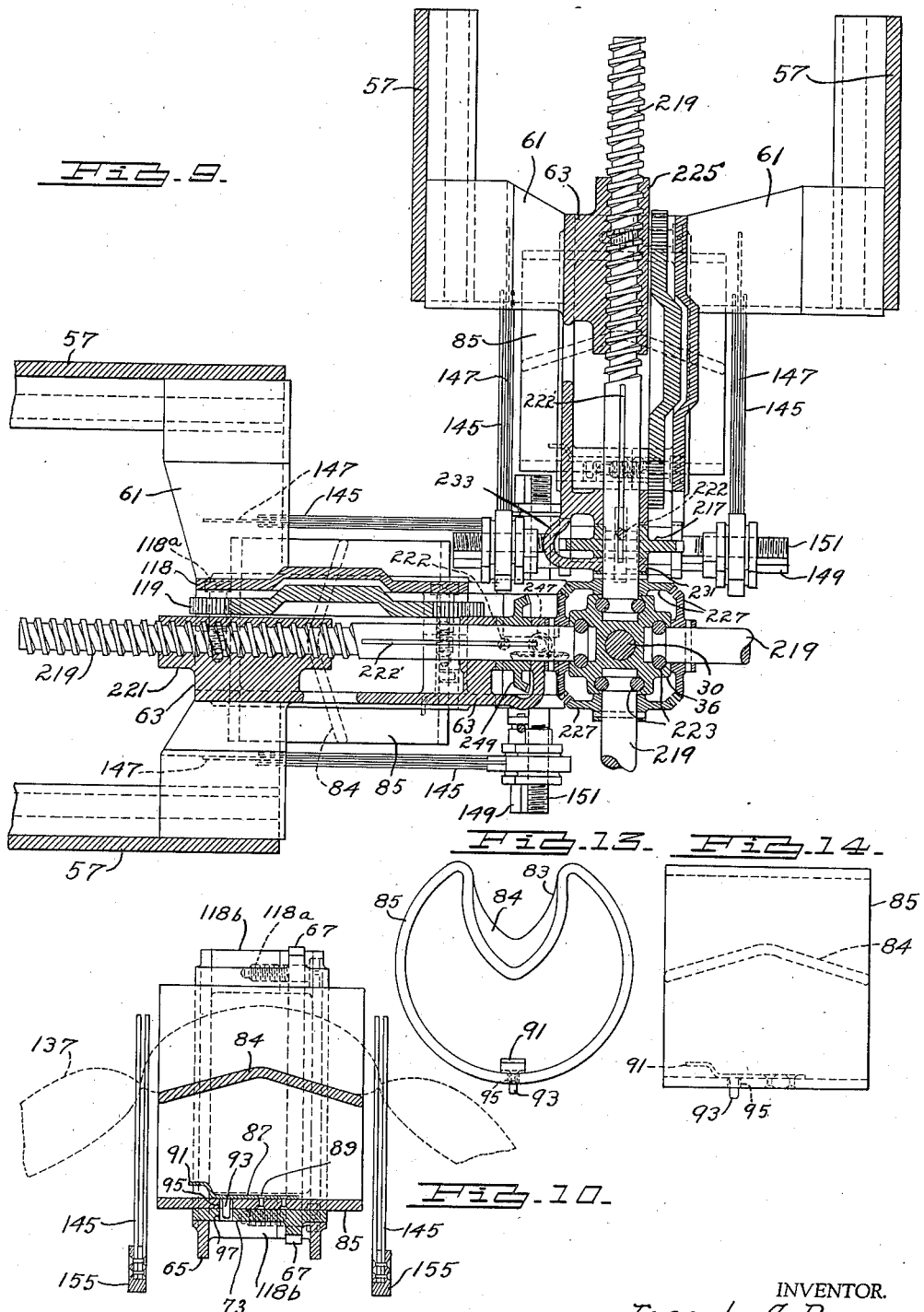
INVENTOR.
Joseph A. Popp
BY
ATTORNEY.

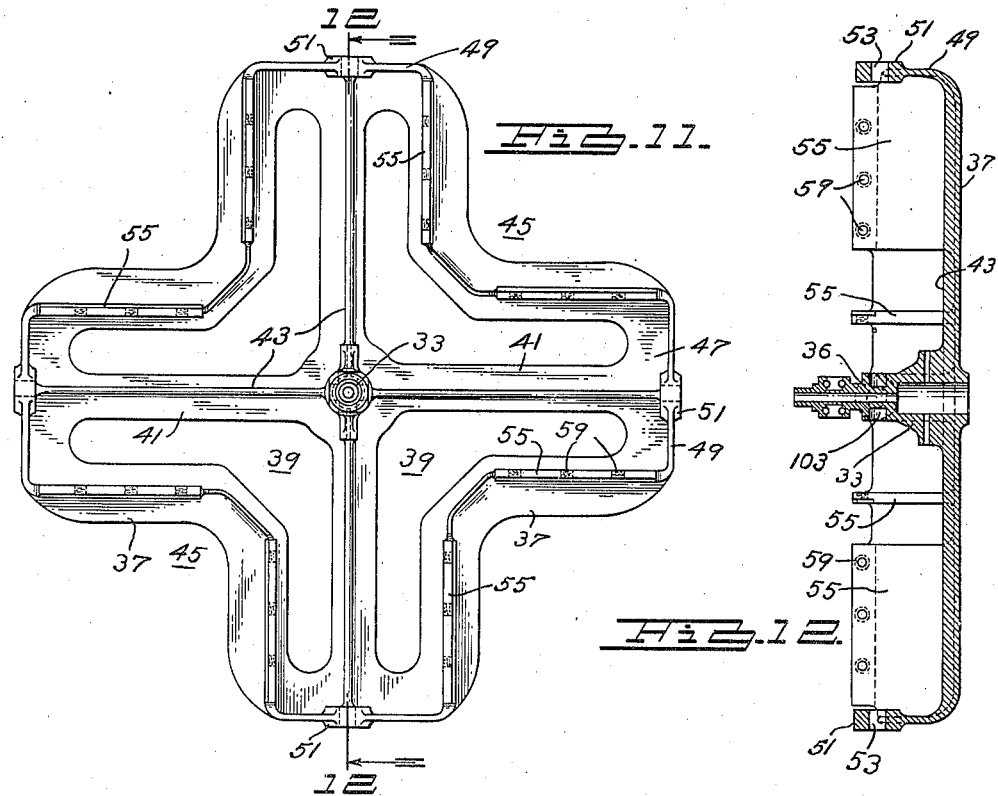
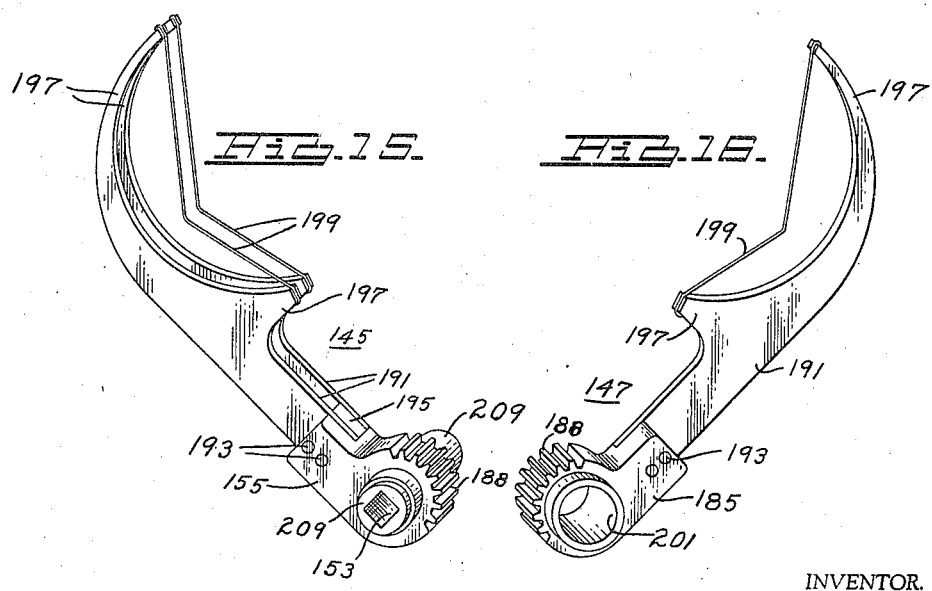

Patented Jan. 21, 1941

2,229,590

UNITED STATES PATENT OFFICE 2,229,590

SAUSAGE MACHINE

Joseph A. Popp, Detroit, Mich.

Application April 23, 1938, Serial No. 203,803

11 Claims. (Cl. 17—34)

My invention pertains to sausage linking and twisting machines and more particularly to a machine for linking and twisting sausage links of various sizes and lengths.

It is an object of my invention to provide an improved machine for linking and twisting sausage which has positive operating characteristics for twisting the sausage with a minimum of friction on the sausage casing, which is convenient to adjust and repair, and which is of a sanitary easily cleansable construction.

It is also an object of my invention to provide an improved adjustable twisting machine of simple construction which accurately produces sausage links of uniform length and which may be conveniently adjusted to make the sausage links of any desired length.

Another object of my invention is to provide an improved sausage machine comprising a rotatable reel carrying a plurality of twisted heads disposed in radially adjustable relation thereon for making sausage links of different lengths, and each twister head having driving means extending for engagement with a stationary segmental gear to rotate each twister element during a suitable portion of its orbit of revolution and means engaging a stationary cam for working the pincher arms in proper sequence for pinching, linking, holding, twisting and releasing a filled sausage casing.

It is a further object of my invention to provide such sausage twisting and linking machines in which each twister head comprises a twister gear open along one side and journalled in a bearing which is open on one side, a twister element in the twister gear having a recess in one side in alignment with the open portion of the gear for receiving a sausage casing, releasable means for securing the twister element in the twister gear whereby twister elements of different lengths may be conveniently substituted for making sausage links of different lengths, and driving means actuated in accordance with the movements of the movable member for rotating the twister gear.

Another object of my invention is to provide such a sausage machine having pincher means spaced from the ends of the twister element and supported in adjustable spaced relation for cooperation with twister elements of various lengths comprising, a pair of pincher shafts journalled substantially parallel to the axis of rotation of the twister gear, pincher arms on each shaft extending adjacent each end of the twister element whereby two pairs of pincher arms are provided to pinch the sausage casing adjacent the ends of the twister element for linking the casing and securing it as the twister element rotates, and movable means for securing each pincher arm upon its shaft whereby the pincher arms may be conveniently spaced along the shafts to different positions for making sausage links of different length.

A further object of my invention is to provide twister heads as unitary assemblies including the twister element, the pinchers, and associated actuating mechanism which can be conveniently detached or replaced as a unit for cleansing, adjusting and repairing.

Also it is an object of my invention to provide twister elements which are conveniently interchangeable, each comprising an open recess extending along one side with inclined side walls and a bowed bottom wall for receiving and also for holding and twisting various sized sausage casings, and a releasable locking member resiliently projected from the element for conveniently securing the same in a rotatable twister gear.

Further objects and advantages are within the scope of my invention, such as relate to the arrangement, operation and function of the related elements of the structure, to various details of construction and to combinations of parts, elements per se, and to economies of manufacture and numerous other features as will be apparent from a consideration of the specification in conjunction with the drawings disclosing a specific embodiment of my invention, in which:

Fig. 3 is an enlarged sectional view taken transversely across a pair of the radial guide rails showing how a twister head is mounted thereon with its actuating members extending through between the rails;

Fig. 4 is an enlarged sectional view taken on line 4—4 of Fig. 3 and extending outwardly through the outer edge of the main frame, a portion of the adjacent push rod 161 being broken away to show the more remote connections;

Fig. 5 is a sectional view taken on line 5—5 of Fig. 4;

Fig. 6 is a sectional view taken on line 6—6 of Fig. 3 and extending through the center of the machine;

Fig. 7 is a front elevational view of the machine with the reel and all the elements omitted except the portions of the actuating members which engage the stationary gear, cam and locking surface on the main frame and so shown to provide an operating or timing diagram;

Fig. 8 is an enlarged detail view taken on line 8—8 of Fig. 7;

Fig. 9 is a sectional view taken on line 9—9 in Fig. 4;

Fig. 10 is a sectional view on line 10—10 of Fig. 4, extending longitudinally through one of the twister heads;

Fig. 11 is a plan view showing the rotatable reel which forms radial guide rails for adjustably and rotatably supporting the spaced twister heads;

Fig. 12 is a sectional view taken along line 12—12 thereof;

Figs. 13 and 14 are respective end and side elevational views of one of the twister barrels which is inserted into each twister head;

Fig. 15 is a perspective view of the female pincher element for pinching and linking the sausage casing;

Fig. 16 is a perspective view of the male one of the pincher elements; and

Fig. 17 is an elevational view looking into the intake side of the machine as represented by line 17—17 on Fig. 1.

Figure 1:
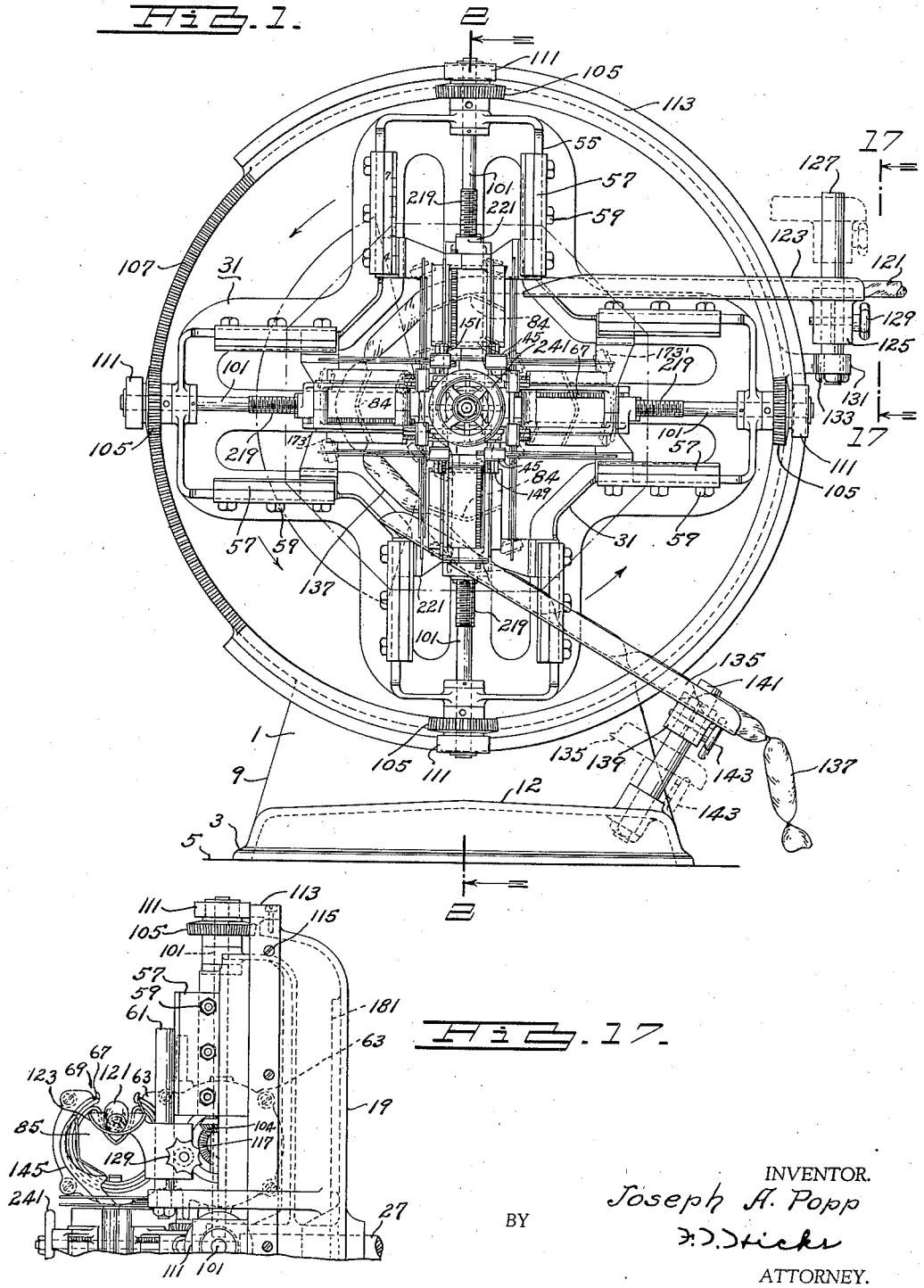
Fig. 1 is a front elevational view of my sausage linking and twisting machine showing the spaced twister heads disposed on the radially extending guide rails for adjustment to make links of various sizes, and showing a filled sausage casing entering at the top.
Figure 2:
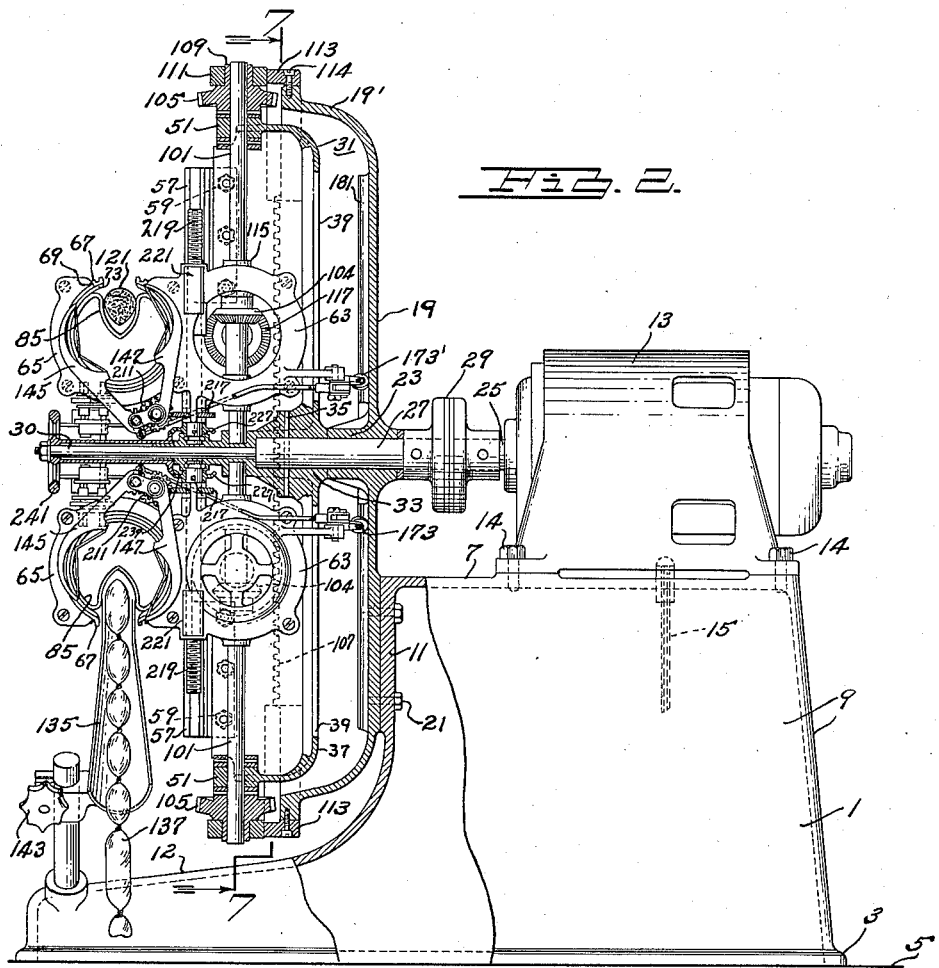
Fig. 2 is a side elevational view of the machine partially broken away and sectioned as indicated by line 2—2 in Fig. 1.

Referring more particularly to Figs. 1 and 2 of the drawings, it will be seen that my improved sausage linking and twisting machine comprises a pedestal 1 which is preferably a hollow metal construction, such as a unitary casting. The pedestal may be made of any suitable cast metal such as cast iron and it is provided with a lateral flange 3 around the bottom edge for mounting securely and distributing the weight on the floor 5 where the machine is installed. The pedestal comprises side walls supporting a raised platform 7, and three of the side walls 9 of the base are inclined outwardly from the platform down to the base flange 3, while one side wall 11 thereof extends down in a substantially vertical direction, curving out to provide a low extended toe portion 12.

On the platform 7 I mount an electric-gear motor 13, which is a well known construction of the planetary reduction concentric shaft type, including built-in reduction gears. Any suitable poly-phase or single-phase motor of this type may be utilized, but a one-fourth horse power motor with a gear reduction ratio to drive the main shaft at about 12½ R. P. M. has proven satisfactory for this purpose. The motor is bolted firmly to the platform by bolts 14 extending therethrough in the usual manner, and energizing conductors 15 are extended therefrom through suitable control apparatus (not shown) in order the motor might be stopped and started and its speed adjusted in the usual manner.

The main frame 19 of the machine is a large circular member, which may be a casting of any suitable metal, such as cast iron. The peripheral edges of the circular frame 19 are turned out from the bottom in cup-like conformation providing cupped side walls 19' enclosing a space in which the working parts of the machine are housed, and from which they support and operate any number of twisters.

The bottom of the frame 19 is snugly secured by bolts 21 to the vertical side wall portion 11 of the pedestal, and it rises perpendicularly above and adjacent to one end of the motor platform, with the cupped edges turned away from the motor. Integral with the center of the bottom of the cupped frame 19 is a hub 23 through which a bearing aperture extends. The frame member 19 is suitably mounted on the pedestal to position hub bearing 23 in alignment with the shaft 25 projecting from the motor. The main bearing 23 is lined with suitable bearing metal and provision made for lubrication in accordance with the usual practice. In the main bearing 23 is supported and journalled the main shaft 27 for driving all the working parts of the machine.

The main shaft 27 of the sausage machine is connected to the motor shaft 25 through any suitable flexible coupling device 29, providing a semi-flexible connection rendering it unnecessary to provide and maintain precise alignment. The remote end of shaft 27 is turned down to provide an extension 30 of reduced diameter.

On the end of the large portion of main shaft 27 which extends through the main bearing 23, I mount a reel 31 having a hub 33 which is rigidly secured on the shaft by a pin 35, as shown in Fig. 2, or by other suitable key means. A hub extension 36, shown in Fig. 4, receives the reduced shaft extension 30 projecting therethrough.

The reel 31 is the largest moving member in the sausage machine, and it supports the various twister heads and actuating mechanism which it carries around an orbit of revolution to receive filled sausage casing and to engage stationary actuating members supported on the main frame, in a manner to be subsequently set forth. For supporting the twister heads the reel 31, as shown in Figs. 11 and 12, comprises a unitary casting having a bottom wall 37 with four open portions 39 through which the operating members extend for actuating the elements of the twister heads as the reel rotates. The openings 39 in the bottom wall of the reel are of L shape and suitably spaced to define spokes 41 radiating from the central hub 33 on which the reel is supported. A web 43 extends along the front side of each spoke 41 for reinforcing it from the hub. To eliminate excess weight, open corners 45 are provided where the extension of the metal of the bottom wall 37 would serve no useful purpose, whereby the overall shape of the reel resembles a Greek cross having four arms 47.

The outer end of each arm of the reel is provided with an end wall 49 turned out to the front side of the reel, and supporting a bearing bracket 51 in which is a shaft journalling aperture 53. The bearing aperture 53 may be lined with any suitable bearing metal providing for lubrication in any well known manner, or if desired roller bearings may be provided, as will be understood. Rising vertically from the bottom wall 37 on each arm of the reel is a pair of twister head supporting guide flanges 55 which extend in parallel spaced relation to the outer end of the arm joining the ends of the end walls 49 thereon. The guide flanges 55 are formed integral with the bottom wall 37 and the end walls 49, thus forming a construction which is rigid and strong as well as easily cleaned. On the upper edge of each guide flange 55 I secure a guide rail 57 by means of bolts 59.

As shown more clearly in Fig. 3, each guide rail 57 comprises a V-shaped channel turned inwardly toward the opposite rail for receiving and securing the outer tapered edges of a pedestal flange 61 extending from and supporting a twister body 63 with which it may be an integral casting. In this manner the twister body 63 is slidably supported between each pair of guide flanges 55 for radial adjustment to different positions on the reel, and each radially adjustable twister body carries with it the various elements for receiving, pinching, linking, twisting and releasing the sausage casings as the reel rotates. This collection of associated elements I designate as the twister head, or the twister head assembly.

Each twister body has a large bearing 65 in which is journalled a twister gear 67. As shown in Fig. 4, the twister gear bearing 65 has an open slot 69 through one side thereof and the twister gear has a corresponding open slot 71 through one side. As indicated by line 10—10, a section is taken longitudinally through the center of the twister and this view is shown in Fig. 10, from which it will be seen that the twister gear 67 comprises a tubular or cylindrical element 73 which extends axially in the bearing 65 of the twister head.

For receiving and holding sausage casing which passes into the open slot 71, I provide any suitable twister element forming a trough or recess 83, of a suitable shape, as shown in Fig. 4. The side walls of the recess 83 are suitably inclined as shown for gripping the sausage casing to hold it effectively and without injury. As shown in Fig. 10, the bottom 84 of the trough 83 is bowed outwardly in the middle to bend the sausage casing and to cooperate with the side walls inclined to hold the sausage casing so it is twisted with the trough and does not turn relative to the side walls thereof. For this purpose, the twister element may be a cylindrical barrel 85 of a suitable size to fit into the gear ring 73. The cylindrical twister barrel 85 may be made of any corrosion resistant metal, as by casting or pressing, and the ends of the trough 83 are bowed back from the center so that at the ends the bottom 84 of the trough passes slightly toward the opposite side of the axis of the barrel.

To facilitate insertion and removal of the twister barrel 83 in the twister gear ring 73, I provide a quick releasable fastener comprising a flat leaf spring 87, one end of which is fastened flush on the inner surface of the cylinder 85, as by rivets 89. The free end of the leaf spring 87 is deformed away from the wall of the twister barrel to provide a finger catch 91 whereby the spring may be conveniently deflected toward the axis of the barrel. Secured to the outside surface of the spring 87 is a latch pin 93, which may be attached as by welding or riveting, projecting through an aperture 95 in the side wall of the twister barrel into an aligned aperture 97 in the gear ring.

When the twister barrel 85 has been properly inserted into the gear ring 73, so that the sausage receiving trough 83 is in alignment with the open slot 71 in the twister gear, the two apertures 95 and 97 will then be aligned. When the finger hold 91 is released, the twister barrel is latched securely in the twister gear, as shown in Figs. 4 and 10. Sets of twister heads of different lengths may be provided for convenient insertion to twist sausage links of different lengths when the twister heads are moved radially on the reel, in a manner to be subsequently described.

Four twister drive shafts 101 are provided extending radially, as shown in Figs. 2, 4 and 6, the inner ends being journalled in suitable bearings 103 in the hub extension 36 of the reel, as shown in Fig. 4. The intermediate portion of each twister drive shaft 101 passes through the body portion 63 of one of the twister heads where, in a suitable aperture, it supports and drives a bevel gear 104. The bevel gear 104 is driven by means of a screw pin 104' which extends through the hub of the gear into a slot 106 extending axially along the outer surface of the shaft. In this manner the bevel gear 104 is slidably supported on the twister drive shaft and it is free to move with the twister head as it is adjusted radially.

The outer ends of the twister drive shafts 101 extend through the bearing brackets 51 in the outer ends of the four arms of the reel and are journalled therein. A collar 102 is secured firmly on each shaft 101 against the inner side of each bearing bracket 51 by a pin or screw 102', thus securing the inner end of each shaft in the bearing in the hub of the reel. The portion of each twister drive shaft 101 which extends outwardly from the bearing 51 carries a twister drive gear 105 secured rigidly thereon, as by a suitable key pin 105'. As the reel rotates, the four twister drive gears 105 mesh successively with a gear segment 107 which is provided on the outer edge 19' of the stationary frame 19, and which extends around a predetermined portion thereof. The segment gear 107 is cut integral with the outer edge of the main frame, as shown, or it may be provided as a separate piece secured thereon in any suitable manner as will be readily understood. The twister drive gear 105 has an outwardly projecting hub 109 on which a locking block 111 is rigidly secured.

The locking block 111 is square, as shown in Fig. 8, or it may be circular with one flat side because it is utilized only for locking in one position. For engaging a flat side of the locking block 111 to lock the twister shaft 101 against rotation, an annular locking ring 113 is secured by screws 114 to the outside of the rim 19' of the main frame around a predetermined portion thereof. Each twister drive shaft is thus successively locked, or rotated, to lock or drive the respective twister barrels, as the reel rotates.

Each twister drive shaft 101 rotates in bearings 115 in the associated twister body 63 and extends through the aperture 116 therein where, as previously described, it drives the slidable bevel gear 104. The slidable bevel gear 104 in the aperture 116 meshes with and drives a second bevel gear 117 which is journalled on a stud shaft 117a projecting from a side wall 118 which is secured on the side of the twister body 63 by screws 118a. The side wall 118 of the twister body is held firmly against bosses 118b which extend between the side wall 118 and the main body 63 of the twister head so that the screws 118a pass therethrough. The second bevel gear 117 drives a mutilated gear 119 which is pressed on the hub thereof, as shown in Fig. 6. The large mutilated gear 119 is of dished conformation, and it meshes with and drives the twister gear 67, as shown in Figs. 4 and 5. As shown, the gear 119 is of the same diameter as the twister barrel receiving gear 67, and it is provided with an elongated blank tooth 120 for meshing into the open space 71 in the open side of the twister gear 67. The twister barrels 85, which are held in the twister gears 67 in the manner previously described, are thus smoothly driven to twist the sausage casings received in and held by each trough 83.

In Figs. 1 and 7, the circumferential positions and spacing of the gear segment 107 and the locking rail 113 are clearly illustrated, and it will be seen that as the reel rotates, the respective twister shafts 101 are successively driven and successively locked. The gear segment 107 is selected of a suitable length with reference to the size of the twister driving gears 105, to turn each twister barrel 85 three complete revolutions as it passes. During the remainder of the cycle, the arcuate locking rail 113 locks each twister barrel stationary with the open slot exposed to receive the filled sausage casing 121 from any suitable source such as a guide chute 123 over which it passes from any stuffing machine tube (not shown).

As shown in Fig. 1, guide chute 123 has a split extension 125 which is suitably apertured for sliding upon a vertical bar 127 to which it may be secured by means of a clamping screw 129 passing therethrough. The lower end of the vertical standard 127, which is of reduced diameter, passes through an aperture in a lug 131 extending laterally from the side of the main frame 19 of the machine, and it is secured therein in any suitable manner as by applying a threaded nut 133 on the lower end. The guide chute is of a proper length to extend the inner end adjacent the twister barrels, as they are carried over the upper portion of the orbit of revolution by the rotation of the reel. A sausage receiving chute 135 is provided and suitably positioned for receiving the twisted and linked sausage 137 from the twister heads as these are carried down to the lower portion of the orbit of revolution. The sausage receiving chute 135 is supported by means of a split extension 139 sliding on a rod 141 projecting up from the toe 12 of the machine pedestal. An adjusting screw 143 is provided for clamping the receiving chute at various positions.

When the twister heads are adjusted radially on the reel to make sausage links of a greater length, in a manner to be subsequently described, the sausage delivering and receiving chutes 123 and 135 are by means of this arrangement conveniently adjusted to wider positions, as represented by dotted lines.

Pinching means is provided, as shown in Figs. 3, 4 and 5, at opposite ends of each twister element 85 for linking and holding the sausage casing as the twister rotates. For this purpose I provide two pincher arms 145 and 147, disposed to operate as a pair of pinchers adjacent each end of the twister barrel. In order to separately support the pincher arms of each pair in cooperative relation, a pair of shafts 149 and 151 are journalled in bearings 152 in the twister body 63 from which they project in spaced parallel relation. The shaft 151 extends through the twister body projecting therefrom at opposite ends. The projecting end of the first shaft 149 is square for sliding loosely into a square aperture 153 in the heavy shank 155 of the pincher arm which is thereby positively actuated and slidably supported.

On the square ended pincher shaft 149, a crank 157 is secured, as by a pin 159, and it extends laterally having an aperture in the extended end for pivotally receiving one end of a pincher actuating rod 161 secured therein in any suitable manner as by a cotter pin 163. The other end of the pincher operating rod 161 is threaded for securement in a threaded aperture in a connecting clevis 165 which is pivotally connected to one end of a bell crank 167 by a pivot pin 169 extending therethrough. The other arm 171 of the bell-crank is suitably bifurcated to support a pincher operating roller 173 on a pivot pin or axle 175 passing therethrough. The junction of the bell-crank arms is journalled on a pivot pin, or screw 177 extending therethrough into the end of a rigid bracket 179 projecting from the inner portion of the twister body 63 and passing through the aperture 39 in the bottom of the reel.

In this manner the roller 173 is so supported that it is carried along adjacent the inner surface of the bottom of the main frame 19, as the reel rotates, and when the roller engages and rolls over a raised cam surface 181 the bell-crank 167 is rocked, thus pushing the pincher push rod 161 and rocking the pincher shaft 149 and moving the pincher arm 145 adjacent the end of the twister barrel 85.

In Fig. 7 it will be seen that the operating cam 181, which operates the pincher rollers as the reel rotates, is of a conformation defined by an arc of a circle around the outer margin 183, and straight line edges extending from the ends of the curved edges toward the central portion of the machine. The upper straight line edge 185 of the pincher operating cam is a rising surface on which the rollers rise and close the pinchers as the reel rotates, and the lower straight line edge 187 is the drop surface which permits the pincher rollers to drop back and open the pinchers after the sausage has been linked and twisted. Returning to Fig. 3, it will be seen that a tension spring 189 is provided for continuously biasing the rollers 173 against the cam 181 and toward the bottom of the main frame 19 of the machine to open the pinchers as soon as the rollers pass off of the cam.

For simultaneously operating the other or male pincher arms 147 adjacent the ends of the twister barrel in cooperative relation with pincher arms 145, the heavy shank portion of the latter has a substantially cylindrical terminal with gear teeth 188 cut or formed thereon in any suitable manner, as shown more clearly in Fig. 15. The heavy shank 185 of the other pincher arm 147 is similarly provided with gear teeth 188 which mesh with the teeth on the directly operated pincher arm 145 for simultaneous operation therefrom.

The square ended pincher shaft 149 terminates in the middle of the twister body and the bearing 152 is suitably apertured to permit the insertion of a transverse pin 187 through a collar 189 to hold the shaft in the head, as may be seen in Fig. 5. For supporting a similar female pincher arm 145 adjacent the other end of the twister head, a similar square ended shaft 149' projects therefrom carrying a crank 157'. A rod 161' extends from the crank, as shown in Fig. 5, for operation from a suitable bell-crank 167' and roller 173', as shown in Fig. 3, similarly to the operation of the shaft 149 previously described. The leading rollers are designated by 173' while the following rollers are designated by 173.

As shown in Fig. 15, the female pincher arm 145 comprises a pair of relatively thin metal elements 191 such as sheet metal stampings, which are secured to the heavy shank 155 in spaced and substantially parallel relation as by rivets 193 or other suitable fastening members. The thin pincher elements 191 may be spaced apart as by a spacing member 195 clamped between and they extend in parallel spaced relation.

It will be understood that the thin pincher elements may also be secured together on the shank and spaced apart by distorting the extended portions. Each of the thin pincher elements 191 carries a pair of fingers 197 which project laterally in spaced apart relation from one side or edge thereof.

The intermediate portions of each member 191 are preferably formed as a segment of a circle, as shown, to strengthen and support the fingers 197. Between the spaced pair of fingers 197 on each element, a thin rod or heavy wire 199 is supported, preferably with sufficient slack and sufficient rigidity to permanently retain a deflected conformation, as shown. The wires 199 are secured to the fingers in any suitable manner, as by soldering or welding for example.

As shown in Fig. 16, the male pincher arm 147 comprises a single element 191 of sheet metal which is similar to the two elements on the other arm and which is secured to the heavy shank 185 by rivets 193, or other similar fastening means. Also a pair of fingers 197 extend similarly in spaced relation from one side of the thin element of the male pincher, and a wire or rod 199 is similarly secured to the ends of the spaced fingers to be supported in a slack deflected position therebetween.

The pincher arms 145 and 147 are so relatively mounted on the shafts 149 and 151 that the thin fingers 197 of the male pincher arm are properly aligned to enter between the thin fingers of the female pincher arm each time the pincher arms are operated. This aligned relation is shown in Figs. 3 and 5. Each male pincher arm 147 is mounted for free oscillatory movement on the supporting shaft 151 which does not rotate when the pinchers operate but serves rather as a stationary pivot pin. Also the outer ends of the shaft 151 are threaded, right handed at one end and left handed at the other, so that by rotating the shaft the two pairs of pincher arms at opposite ends of the twister barrel are shifted toward or away from the twister barrel to make the sausage links shorter or longer at will.

In order to so mount and interconnect the pincher arms of each pair that the above functions can be effectively accomplished, I provide a bearing aperture 201 in the shank 185 of each one of the male pincher arms 147 which is substantially larger than the diameter of the threaded shaft 151, and the apertured shank is journalled upon a threaded bushing 203 which is adjustable on the shaft. As shown in Fig. 5, the ends of the threaded bushing 203 are turned down to provide reduced portions 205 to receive apertured retaining straps 207 secured thereon, as by staking the ends of the bushing. The other ends of the retaining straps 207 are suitably apertured to fit freely over extensions 209 projecting from the ends of the shank 155 on other pincher arm 145.

In this construction the straps 207 serve to provide the properly aligned relation of each male pincher arm with reference to the associated female pincher arm and to maintain this aligned relation, as the pinchers are adjustably spaced apart or drawn together, by turning the pincher adjusting shaft 151.

To provide for turning the pincher adjusting shaft 151, for adjusting the spacing of the pinchers, a spiral gear 211 is mounted on the middle of the shaft in the aperture 213 of the twister body, as shown in Fig. 5. The spiral gear 211 is secured to the pincher adjusting shaft by means of a transverse pin 215, shown in Fig. 5, and in addition to rotating the shaft the gear wheel also serves to resist endwise movement of the shaft in its bearings. The spiral gear 211 meshes with and is driven from a suitable gear wheel 217 on a twister head adjusting shaft 219 which is positioned in a direction at right angles to the axis of the pincher adjusting shaft 151. The gear wheel 217 is slidable on the shaft 219, being driven by a pin 222 extending through the hub of the gear wheel into a long slot 222' in the shaft.

Also as shown in Figs. 3, 4 and 5, the twister head adjusting shaft 219 is threaded and extends through a threaded aperture extension 221 in the twister body 63 for shifting the twister head radially on its guide rails 57 while at the same time the rotation of the shaft uniformly adjusts the spacing of the pinchers.

The threaded twister shifting shaft 219 extends radially between the guide rails 57, and at its inner end it is journalled in a bearing aperture in the central hub extension 36 into which it is securely pinned by two pins 223 passing transversely through the bearing and spaced on opposite sides of the axis of the shaft. To receive the locking pins 223, the end of the shaft 219 is provided with an annular groove 225 through which the pins pass to lock the shaft rotatably in its bearing. To provide for rotating the shaft 219, it carries a bevel gear 227 secured thereon, as by a transverse pin 229. A slide ring 231 is concentrically disposed on the shaft 219 adjacent the sliding spiral gear 217. A bracket 233 connects the slide ring 231 with the twister body whereby the spiral gear is caused to slide along with the twister head, thus holding it in mesh with the spiral gear for adjusting the spacing of the pinchers in all positions. The above features associated with the threaded adjusting shaft, are also shown in Figs. 5 and 9.

A convenient manual control is provided for adjusting the twister heads, as shown in Fig. 4, comprising a tubular shaft 235 disposed concentrically on the small shaft extension 30 of the machine, and of a larger diameter. The inner end of the tubular shaft is journalled on a reduced circular boss 237 projecting from the end of the central hub extension 36 and it carries a bevel gear 239 which meshes with the bevel gears 227 on the inner ends of the radial twister adjusting shafts 219.

On the outer end of the hollow shaft 235 is disposed a hand wheel 241 which may be integral therewith or attached thereon, in any suitable manner, as in a unitary casting or a fabricated assembly. A spacing hub 243, integral with the hand wheel, rotates on the outer end of the shaft 30 inside of the outer end of the tubular shaft 235 for supporting it firmly while the hand wheel 241 is manipulated, for simultaneously adjusting all the twister heads.

The four twister head assemblies are all similarly constructed and mounted with cooperatively disposed pinchers arranged for adjustable spacing by means of a threaded shaft in each head operated from an adjacent radial threaded shaft which simultaneously moves the heads radially. All four of the threaded adjusting shafts 219 are shown in the radially arranged positions in Fig. 1, and in Figs. 4 and 9 it will be seen that the inner ends of all four shafts are locked and journalled in bearings in the central hub 36.

The ratios of the gears are so selected that by turning the hand wheel 214, the radial positions of all the twister heads on the reel are varied and adjusted simultaneously and uniformly, while at the same time, the spacing of the pinchers from the ends of the twister barrels is uniformly adjusted to pinch the sausage casing at proper spaces for twisting the sausage links of the proper length. This may be accomplished either by turning the hand-wheel when the machine is still, or by holding the hand wheel while the machine is operating.

As shown in Fig. 9, a compact nesting of the twister heads is obtained by journalling the pincher shafts in different positions in the adjacently disposed twister heads bodies so that they are not in alignment in the adjacent twister heads, but come together in overlapping relation. In this arrangement each diametrically opposed pair of twister-heads has the pincher shafts journalled equal distances out from the bottom of the reel, but different from the next adjacent pair. Hence, in the adjacent twister heads this distance is made different to provide for overlapping and nesting the pincher shafts when the twister heads are drawn toward the center of the reel to make short sausage links, which relation is shown in both Figs. 5 and 9.

In Fig. 5, the two pairs of pincher shafts 149 and 151 which are seen in end view, are positioned more remotely from the bottom of the reel and from the main frame 19, than are the shafts 149 and 151 which are shown in side view in this same figure. The pincher adjusting shafts 151 which are so positioned more remotely from the bottom of the reel are adjusted from the adjusting shafts 219 through bevel gears 241 pinned on the latter, to drive small bevel gears 243 supported on shafts 245 journalled in the twister head body. The other end of each shaft 245 carries a small bevel gear 247 which meshes with a suitable bevel gear 249 on each threaded adjusting shaft 219 which is remotely spaced from the bottom of the reel, as shown more clearly in Fig. 9. The bevel gear 249 is slidably disposed on the shaft 219 driving through a pin 222 in a slot 222′ in a manner similar to the spiral gears 217, as previously described.

Operation of my improved sausage linking and twisting machine is accomplished by starting the electric gear motor 9, which through its reduction gears drives the main shaft 27 of the machine at a speed of about 12½ R. P. M. As the main shaft of the machine rotates, it drives the large reel 31 carrying the open sided twisters around an orbit of revolution adjacent the chute from which filled sausage casing is lodged into the recess or trough of each twister, and as the reel turns the operating parts therein supported are carried around an orbit of revolution for actuation and control by suitable stationary elements which are supported on the main cup-shaped frame of the machine.

The radially disposed twister driving shafts 101 each in succession carries its locking block 111 on its outer end around an arc adjacent the locking plate 113, as shown in Figs. 1, 4, 7 and 8, which, as previously described, locks the open sided twister element in proper position for receiving or delivering the sausage casing. The portion of the arc during which this locking engagement is maintained is clearly shown in Fig. 7, comprising a timing or operating diagram, from which it will be seen that the locking surface 113 extends around the rim of the main frame sufficiently to provide locking for about 210 degrees with a few degrees allowed for dwell.

The arrows indicate the direction of rotation, and as the sausage casing is lodged in the recess or trough 83 of each twister element the inclined tapering side walls grip the casing firmly and uniformly irrespective of the size of the casing thus holding it securely without danger of breakage. Also the operation of drawing the sausage casing into the recess serves also to curve it around the bowed bottom shape of the trough, as shown in Fig. 10, and this holds the sausage casing to twist with the barrel instead of slipping and turning therein.

In Fig. 7, the uppermost twister operating shaft 101 is approaching the end of the actuating gear, and at the same time the pincher rollers are approaching the cam surface for working the respective pinchers at the leading and the lagging ends of the twister. The pinchers actuating rollers are shown in full line adjacent the shaft 27 which is the position for making the shortest sausage links. The dotted lines represent the positions the pincher rollers would occupy when the pincher heads are adjusted for making longer sausage links.

As the pincher actuating rollers are carried by the counter-clockwise rotation of the reel, one of the rollers traverses the rising edge of the cam and rocks the associated bell-crank, closing the pinchers on the sausage casing at the leading end of the twister barrel. As the second or following pincher roller moves on the rising edge of the cam the associated pinchers are closed. This serves to pinch and link the sausage casing at the proper point, the proper spacing of the pinchers being adjusted automatically and simultaneously with the radial positioning of the twister heads to make sausage links of the desired lengths.

As the locking block 111, on the outer end of the radial twister drive shaft 101, separates from the end of the locking arc 113, the gear 105 thereon meshes with the gear segment 107. The continued rotation of the reel then causes the twister drive shaft 101 to rotate for operating the twister through bevel gears 104 and 117, and mutilated gears 119 and 67, as previously described. The ratio of the length of the gear segment 107 and the pitch diameter of the drive gear wheel 105 and the other gear ratios in the gear train are so selected that the twister barrel 85 is rotated three complete revolutions after which the gear wheel 105 runs off of the lower end of the gear segment 107. The lock block 111 then passes adjacent the locking arc 113, and the twister is locked against further rotation with the open portion in the twister gear 67 in alignment with the opening 69 in the twister bearing 65. As the pincher rollers run off the cam drop edge of the cam the biasing springs then throw the pinchers open. The linked and twisted sausage is then released and passes down the sausage chute 135 from which it may be delivered to any suitable conveyor (not shown) for delivery to a packing room or any desired destination.

If it is desired to spread the twisters further apart in order to make longer sausage links of greater length the hand wheel is turned, or held stationary while the machine turns, and this turns the threaded radially extending twister head adjusting shafts, shown in Figs. 1, 3, 4, and 9, in the manner previously explained. This causes all the twister head assemblies to be adjusted radially and uniformly along the guide rails, the bevel gear 104 in each twister head sliding along its twister drive shaft 101, the pin 104′ and slot 106 maintaining driving connection therebetween. At the same time, the spiral gear on each twister adjusting shaft turns each threaded pincher adjusting shaft to space the pincher arms uniformly apart from the ends of the associated twister barrel to pinch and link the sausages uniformly in longer links.

It will thus be seen that in my sausage linking and twisting machine, all the twisters and pairs of pinchers are adjusted simultaneously by a single adjusting operation to accurately produce uniform sausage links of any desired length. The arrangement of the pairs of properly spaced pinchers adjacent the ends of the twister elements with the sausage receiving trough in the twisters positively produces uniformly and neatly twisted links, and the sausage is twisted with a minimum of friction on the casing.

The various parts of my improved machine are made of corrosion resistant metals, such as stainless steel alloys, aluminum, and the like, which may be conveniently cleansed to maintain sanitary conditions.

The twister head assembly construction provides an arrangement which is readily disposed for adjustably mounting on a movable support such as a rotatable reel, and which is also conveniently removable in units for repairs and replacement, and which has positive operating characteristics for twisting sausage casing with a minimum of friction on the sausage casing and to make sausage links of any desired length.

It is apparent that within the scope of the invention, modifications and different arrangements may be made other than herein disclosed, and the present disclosure is illustrative merely, the invention comprehending all variations thereof.

I claim:

1. In combination in a sausage linking and twisting machine, a movable member, a twister head carried by said movable member for receiving filled sausage casing, said twister head comprising a twister gear having a slot open along one side, a twister gear bearing for rotatably journalling said twister gear, said twister gear having an open slot along one side thereof, a twister element having a recess in one side of said element for receiving sausage casing, quick releasable means for securing said twister element in said twister gear with the recess in alignment with the open slot of the twister gear, driving means actuated in accordance with the movements of said movable member to drive said twister gear for rotating said twister element to twist sausage casing received in said recess, a pair of pincher shafts, means for journalling said shafts substantially parallel to the axis of the twister gear, pincher arms on each shaft extending adjacent each end of the twister element whereby a pair of pincher arms is provided adjacent each end of the twister element for pinching sausage casing to link and secure it as the twister rotates, adjustable means for supporting and adjusting each pincher arm upon its shaft for conveniently spacing the pairs of pincher arms for twisting sausages of different lengths, and means operated in accordance with the movement of said movable member for actuating the pincher arms.

2. In combination in a sausage linking and twisting machine, a guide for filled sausage casings, a rotatable reel, a plurality of twister elements each having a sausage receiving recess, mounting means for separately and rotatably supporting said twister elements, adjustable means for securing said mounting means in spaced radially variable positions on the rotatable reel for making sausage links of different predetermined lengths, pinchers for pinching the sausage casing received in the twister elements to link the sausage while it is being twisted, adjustable means for supporting said pinchers adjacent the ends of said twister elements, means for adjusting said adjustable means for simultaneously and uniformly varying the positions of the twister elements and the pinchers for making uniform sausage links of different sizes predetermined at will, and means operated in accordance with the rotation of said rotatable reel for working the pinchers and rotating the twister elements in properly timed relation for receiving, holding, linking and releasing sausage casing received in the recessed twister elements from said guide as the reel rotates.

3. In combination in a sausage linking and twisting machine, a rotatable reel, a plurality of recessed twister barrels, mounting means for interchangeably receiving and rotatably supporting each of said recessed barrels, means for firmly securing said mounting means on said rotatable reel in spaced radially variable positions for making sausage links of different lengths at will, adjustably spaced pinchers adjacent the ends of said twister barrels for pinching the sausage casing received therein to link the sausage and hold it in the barrel, a stationary gear segment adjacent said reel, gear driving means for rotating each twister barrel and disposed for operative engagement with the gear segment during a portion of the revolution of the reel, and cam means for working the pinchers to link and hold the sausage during the rotation of each twister barrel.

4. In combination in a sausage linking and twisting machine, a rotatable reel, a plurality of twister heads, means for securing said twister heads on said rotatable reel in spaced radially variable positions for making sausage links of different lengths, each of said twister heads comprising a hollow twister gear open along one side, a twister gear bearing for journalling each twister gear, a twister barrel, an open recess in the side of each twister barrel for receiving a sausage casing, releasable means for securing each twister barrel in a twister gear with the recess in alignment with the open portion of the twister gear to receive sausage casing from said guide means as the reel rotates, pinchers adjacent the ends of the twister barrels, and driving means for working said pinchers and rotating said twister barrels in proper sequence for linking, holding, twisting and releasing the sausage casing received from a stationary source as the reel rotates.

5. In combination in a sausage linking and twisting machine, a rotatable reel, a plurality of twister heads, means for securing said twister heads firmly on said rotatable reel in variable spaced positions for making sausage links of different lengths, each one of said twister heads comprising a hollow twister gear open along one side, an open sided twister gear bearing for journalling each twister gear, a twister element, an open recess in the side of each twister element for receiving a sausage casing, means for securing each twister element in its twister gear with the recess in alignment with the open portion of the twister gear to receive sausage casing from a stationary source as the reel rotates, a pincher shaft journalled in each twister head, pincher means on said shaft adjacent each end of the twister gear to pinch and hold sausage casing received in the twister barrel, means for holding the pincher means for adjustable spacing on the pincher shaft to cooperate with twister elements of different lengths inserted in said twister gear, driving means for working said pincher means and rotating said twister elements in sequence for receiving, linking, holding, twisting and releasing the sausage casing received from a stationary source as the reel rotates, and means for simultaneously varying the spaced positions of the twister elements on the reel and the pinchers on the pincher shafts.

6. In combination in a sausage linking and twisting machine, a rotatable reel, a plurality of twister elements, means for mounting said twister elements on the reel in spaced positions adjustable to different radial distances from the axis of rotation of the reel, guides for guiding sausage casings to and from said twister elements as the reel is rotated, and means for adjustably supporting said guides for movement toward or away from the twister elements in accordance with the adjusted distances of the twister elements from the axis of rotation of the reel.

7. A twister head assembly for sausage linking and twisting machines comprising, a body, a twister gear open along one side, a twister gear bearing for rotatably journalling said twister gear in said body, said twister gear bearing having an open portion along one side thereof, a twister element insertable in said twister gear, a recess in said element for receiving a sausage casing, and a resilient member for locking said twister element in said gear with said recess in alignment with the open portions of said body and said gear.

8. In a replaceable twister head assembly for sausage linking and twisting machines, a body, a twister gear of substantially tubular conformation open along one side, a twister gear bearing for rotatably journalling said twister gear in said body, said twister gear bearing having an open portion along one side thereof, a substantially cylindrical twister barrel insertable in said twister gear, a recess in one side of said barrel for receiving a sausage casing, a resilient member for locking said barrel in said gear with said recess in alignment with the open portion of the gear, gear means disposed in said body for driving said twister gear, and a driving connection extending from said body for actuating said gear means.

9. In a replaceable twister head assembly for sausage linking and twisting machines, a twister element having an open recess along one side to receive a filled sausage casing, a twister gear having an open portion in one side and an aperture for receiving said twister element with its open recess in alignment with the open portion in the gear, a body, a bearing in said body for rotatably journalling said twister gear, driving means for driving said twister gear, a plurality of pincher shafts, means for journalling said pincher shafts on said body substantially parallel to the axis of the twister gear, pincher means, mounting means supporting said pincher means in adjustable spaced positions on said shafts extending adjacent each end of the twister barrel to pinch sausage casing for linking it as the twister element rotates, and one of said shafts having its opposite ends threaded right and left handed respectively and cooperating with said mounting means to space the pincher means apart when the shaft is rotated in one direction and together when the shaft is rotated in the other direction, and means for actuating said pincher means.

10. A sausage twister comprising, an elongated element, an open recess extending along one side of said element for receiving a filled sausage casing, said recess comprising inclined side walls and a bowed bottom wall, a locking member, and a spring for projecting the locking member from said elongated element to engage a part of a sausage machine whereon the elongated element may be conveniently installed or replaced.

11. A sausage twister comprising, a substantially cylindrical barrel, an open recess extending along one side of said barrel for receiving a filled sausage casing, said recess having inclined side walls and a bowed bottom wall for holding and twisting the sausage casing as the barrel rotates, a locking member extending outwardly through a side wall of said barrel, a flat spring on the inside of the side wall of said barrel for projecting said locking member for securing the twister barrel in a rotatable member, and a finger hold on the end of said flat spring for conveniently retracting the locking members.

JOSEPH A. POPP.